June 24, 1969　　　　S. M. BUDD　　　　3,451,795
PROCESS FOR STRENGTHENING GLASS CONTAINERS
Filed Sept. 2, 1965

Inventor
Sidney Maurice Budd
By Cushman, Darby & Cushman
Attorneys

United States Patent Office 3,451,795
Patented June 24, 1969

3,451,795
PROCESS FOR STRENGTHENING GLASS CONTAINERS
Sidney Maurice Budd, Edgware, England, assignor to United Glass Limited, Staines, England, a company of the United Kingdom
Filed Sept. 2, 1965, Ser. No. 484,568
Claims priority, application Great Britain, Sept. 4, 1964, 36,317/64
Int. Cl. C03c *17/06, 21/00*
U.S. Cl. 65—30
9 Claims

ABSTRACT OF THE DISCLOSURE

Glass containers of increased mechanical strength and abrasion resistance are prepared by (a) forming the containers in a forming machine, (b) spraying all external surfaces of the containers while still hot with a solution of a tin compound, e.g., stannic chloride, in an organic solvent, and (c) subjecting the treating containers while still hot to annealing. Preferably the solution also contains titanium tetra-n-butoxide, bismuth trichloride or titanium tetrachloride.

---

Figure 1:
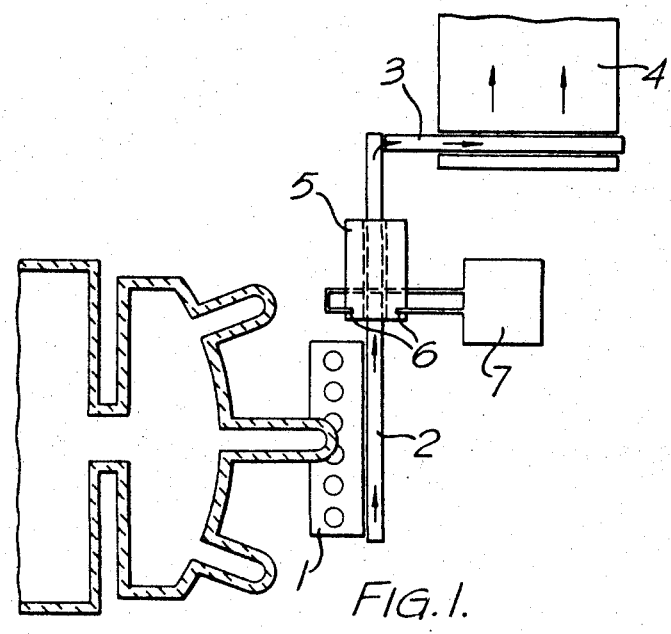

This invention relates to the treatment of glass containers, whereby we mean bottles, jars and the like, and is especially concerned with increasing the mechanical strength of such articles.

Over the past years the users of glass containers have been subjecting bottles, jars and the like to increasing abrasion and impact because of greater handling speed on bottle filling machinery and associated equipment. This has necessitated the manufacture of stronger containers than hitherto so as to withstand such increased impact and abrasion. One way of making a container stronger is by increasing its wall thickness, but a container made stronger in this way would be an unattractive proposition, since it would be heavier and hence more costly to transport, and more costly to manufacture. It is an object of the present invention to provide glass containers which, although no heavier, are stronger than those made hitherto.

As a result of the increased handling speed in container filling plants there is a greater tendency these days for containers to be abraded by each other during transport to washers, fillers, craters and decraters, cappers, labellers, and the like. We have found that such abrasion reduces the strength of the containers. Furthermore, for containers which are reused many times such abrasion is cumulative, and containers which have been in use for some time may be substantially weaker than they were originally. In addition the abrasion of one container by another may produce unsightly marks on the surface of the container with the result that after a while the container may become too unsightly to use. It is also an object of this invention to provide glass containers which, on abrasion between glass of like kind, do not suffer the same loss of strength as, or acquire abrasion marks to the degree of, those made hitherto.

The manufacture of glass bottles and jars is now a highly automated process. It is, therefore, essential that any additional process introduced should not interfere with existing processes, and furthermore it should not introduce additional handling of the ware, for it is known that any handling of glass while it is hot may result in a substantial weakening of the container. Glass containers are manufactured by automatic means in a wide variety of sizes, shapes and colours and glassware manufacturing plant may vary considerably with the type of ware manufactured. Any additional process should preferably be capable of performing satisfactorily on all the range of ware manufactured by automatic means. It is a further object of this invention to provide a process for treating glass containers which can be incorporated into any process for the automatic manufacture of glassware without interference to the normal running of such process, and without additional handling of ware during the additional process.

The automatic production of glass containers is also a 24-hour continuous process, and clearly it is desirable that any additional process introduced into this manufacture should not require continuous attention, and in the event of variability in the additional process, it would clearly be disadvantageous if some deleterious side effect was produced. Accordingly it is a further object of this invention to provide a method of increasing the mechanical strength and abrasion resistance of glass containers by means of a process which may be incorporated into the process for automatic manufacture of glassware without interference to the normal running of such process, and such that supervision is not greater than that which would normally be required for a process of this type.

The objects of the present invention may be accomplished by a process which comprises treating glass containers with a solution or dispersion of a tin compound in an organic solvent at a temperature high enough to cause reaction between them and the tin compound.

The tin compound is preferably a stannic compound and amongst these the stannic halides are most suitable. Stannic chloride is preferred.

Care must be exercised in the choice of organic solvent used as the applying medium, since clearly a solvent of very low flash point could be dangerous. We have found it of advantage to apply the tin compound to the containers in a lower alcohol solvent. Alcohols suitable for the process of the invention are those having up to 6 carbon atoms in the molecule, isopropyl alcohol being preferred. The container-treating liquid may comprise between 80 and 95% by weight alcohol and between 5 and 20% by weight tin compound. A particularly suitable treating liquid comprises 90% by weight isopropyl alcohol and 10% by weight stannic chloride. Other suitable alcohols are ethyl, methyl and n-propyl alcohols, and mixtures of these with or without isopropyl alcohol.

A preferred method of carrying out the invention is to spray the hot containers with the treating medium, for example immediately after they leave the forming machine and before they enter the annealing lehr, and a particularly effective way of treating the containers is by passing them through a very fine mist of the treating medium. The temperature of reaction will normally be at least 350° C., and will preferably be between 400 and 650° C. It is also possible to apply the treating medium to cold, or relatively cold, containers, and thereafter to heat the containers to the reaction temperature. This last method is not preferred since it would not be economically practicable, and since the degree of increase in mechanical strength would not be as great as that which would have obtained had the treating medium been applied to the bottles immediately after formation and while still hot.

The commercial washing of bottles is carried out usually at a temperature in the range of 65 to 85° C., and in the presence of an alkaline solution, corresponding to a pH of 10 or greater. Under such conditions, it is possible that dissolution of the stannic oxide film from the surface of the glass may take place to a degree such that, particularly if the bottles were used repeatedly, the bottles would tend to lose the strength characteristics acquired by virtue of treatment in accordance with the invention. We have found that such chemical attack may be retarded by incorporating into the tin compound treating mixture a small amount of a modifier, which modifier is chosen having regard to the characteristics required for the finished container and has the effect of improving the resistance of the coating to chemical attack without affecting any of its other properties. The modifier may be present in an amount of as much as 10% by weight on the weight of the tin compound, and preferably amounts to 3 to 8%, on the same basis. A typical treating solution might comprise 90% by weight isopropyl alcohol, 9.5% by weight stannic chloride and 0.5% by weight of a modifier such as titanium tetrachloride, titanium tetra-n-butoxide or bismuth trichloride, or a mixture of these.

Figure 2:
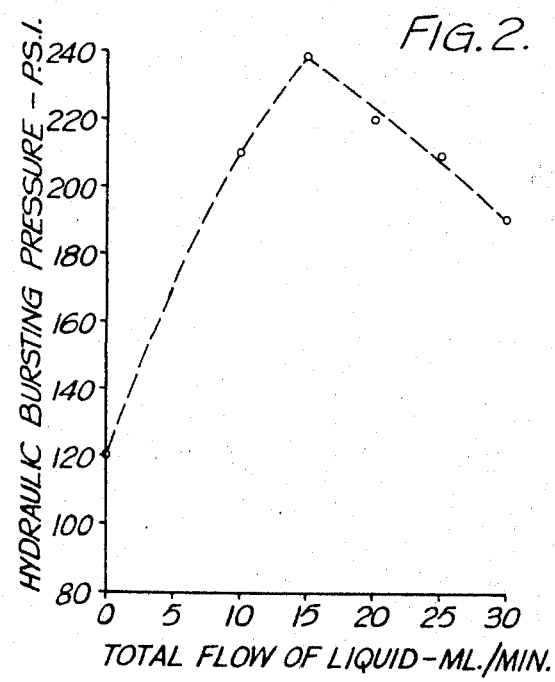

The invention will now be described with reference to the accompanying drawing, wherein FIGURE 1 is a diagrammatic plan view of a container forming machine and FIGURE 2 is a graph showing the variation in pressure required to burst bottles treated with different concentrations of treating solution.

Referring to FIGURE 1, there is shown an automatic bottle machine 1 delivering bottles on to a conveyor 2. Previously such bottles, at a temperature of 400–650° C., would have been transferred to a second conveyor 3 from whence they entered an annealing lehr 4. In accordance with this invention a tunnel 5 is mounted over conveyor 2. The tunnel may be as little as 18", or up to several feet, long. Preferably it will be between two and three feet long, and it may be mounted on the framework of the conveyor or suspended from some independent point. Hot bottles emerging from the forming machine pass through this tunnel wherein is created a mist of liquid reagent so that a layer of such reagent is formed on all external surfaces of the bottles, including the bottom, which latter becomes so treated by the action of the reagent film present on the conveyor belt, as a result of spray coagulation with such conveyor belt. The bottles then pass on to the second conveyor 3 and into the lehr 4 in the normal manner. The mist of liquid reagent is created by mounting atomisers 6 at suitable holes in the sides of the tunnel. These atomisers may be of the pressure jet variety. Preferably they atomise by mixing a stream of liquid with air at 5–20 pounds per square inch pressure. The liquid, which may, for example, comprise 90 parts by weight isopropyl alcohol, 9.5 parts by weight stannic chloride and 0.5 part by weight modifier is pumped to each atomiser by a metering pump 7 fed from a reservoir.

Bottles treated as described above are found to have greater strength and abrasion resistance than bottles manufactured hitherto. Furthermore, the following table, which gives the minimum angle at which one bottle will slide against another of like kind, shows that ease of sliding has been increased by the process of this invention.

| Bottle type: | Angle of slide |
| --- | --- |
| Normal | 27° |
| As treated in accordance with this invention | 22° |

As an alternative to the example above, the tunnel may be mounted over the second conveyor instead of the first conveyor. The number of atomisers in the tunnel will normally be between two and twelve, and the flowrate of liquid through each atomiser, which may be independently varied, will normally be in the range of 2–12 ml. per minute. However, variables such as these will in most cases depend on the size of the machine, the output thereof, the speed of the conveyors, the concentration of the treating liquid, and so on.

We have found that, other things being fixed, the flow rate of liquid to the atomisers is an important variable, and there is an optimum value of flow rate for producing the most beneficial effect. FIGURE 2 shows a typical example, where an increase in flow rate to the optimum value resulted in an increase in mechanical strength, as measured by the hydraulic pressure test, amounting to almost 100% of the value of that of the untreated bottle. Further increase in flow rate beyond this point resulted in a decrease in strength, although the value never decreased to that of the untreated container.

The following examples are given for the purpose of illustrating the invention.

Example 1

Straight-sided round jars were produced on an automatic forming machine at a speed of approximately 100 jars per minute. After leaving the forming machine the jars were allowed to pass through a tunnel of length 2'6", wherein were situated four atomisers, two one each side of the tunnel. A treating solution comprising 90% by weight isopropyl alcohol, 9.5% by weight stannic chloride, and 0.5% by weight titanium tetra-n-butoxide was metered to each atomiser at a rate of 4 mls. per minute per atomiser, and the atomising was carried out by air at 10 lbs. per sq. in. After passing through the tunnel the jars were passed in the normal way into the annealing lehr. After annealing, the treated jars were found to have a crushing strength of 2450 lbs. wt. whereas those manufactured normally, i.e., without the additional process of the invention, had a crushing strength of 1740 lbs. wt.

Example 2

Cylindrical narrow-mouth milk bottles were manufactured on an automatic machine at a speed of 50 bottles per minute. The bottles were treated similarly to the jars described in Example 1, except that the tunnel was 3' in length, and contained six atomisers, three on each side of the tunnel, and through each atomiser a material flow rate of 3.5 mls. per minute was maintained, with air at 10 lbs. per sq. in. as the atomising fluid. The treating material used was the same as that described in Example 1. After the bottles had been annealed, they were tested by the hydraulic pressure strength method and their strength found to be 480 lbs./sq. inch compared with a value of 320 lbs./sq. inch for bottles not treated by this process. Samples of the bottles treated by this process, and bottles not treated by this process, were then placed on a continuously revolving conveyor belt, such that the bottles were given a substantial glass to glass abrasion during the course of the movement on this belt. After five minutes of such treatment, the strength of the treated bottles, as measured by hydraulic pressure, was found to have fallen to 430 lbs./sq. inch whereas that of the untreated bottles had fallen to 250 lbs./sq. inch. In addition, the untreated bottles showed unsightly abrasion marks, whereas the treated bottles showed no such marks.

Example 3

Whisky bottles of concave-convex shape were produced at a speed of 30 bottles per minute. Treatment was carried out as described in Example 1, except that only two atomisers, on on each side of the tunnel were used, and the tunnel was 2' long. Material as described in Example 1 was passed through each atomiser at a flow rate of 4 mls. per minute, atomised by air at 10 lbs. per sq. in. After annealing the treated bottles were found to have a hydraulic bursting pressure strength of 55 lbs./sq. inch compared with a value of 25 lbs./sq. inch for bottles not treated by this process.

What is claimed is:

1. A process for the manufacture of glass containers of substantially improved strength which comprises the steps of (a) forming the containers, (b) spraying substantially all external surfaces of the formed containers while still hot from the forming operation with a composition of 5 to 20% by weight of stannic chloride and 80 to 95% by weight of isopropyl alcohol, and (c) subjecting the treated containers while still hot to annealing.

2. A process according to claim 1 wherein said composition contains about 90% by weight isopropyl alcohol and about 10% by weight stannic chloride.

3. A process according to claim 1 wherein said composition also contains a modifier in an amount of up to 10% by weight of the stannic chloride, said modifier being at least one compound selected from the group consisting of titanium tetra n-butoxide, bismuth trichloride and titanium tetrachloride.

4. A process according to claim 3 wherein the modifier is present in an amount of from 3 to 8% by weight of the stannic chloride.

5. A process according to claim 4 wherein said solution contains 90% by weight isopropyl alcohol, 9.5% by weight stannic chloride and 0.5% by weight of a compound selected from the group consisting of titanium tetrachloride, titanium tetra n-butoxide and bismuth trichloride.

6. A process according to claim 1 wherein said composition is applied in the form of a fine mist.

7. A process according to claim 1 wherein the containers are bottles.

8. A process for the manufacture of glass containers of substantially improved strength which consists essentially of the steps of (a) forming the containers, (b) spraying substantially all external surfaces of the formed containers while still hot from the forming operation with a composition of 5 to 20% by weight of stannic chloride and 80 to 95% by weight of isopropyl alcohol, and (c) subjecting the treated containers while still hot to annealing.

9. A process according to claim 8 wherein said composition also contains a modifier in an amount of up to 10% by weight of the stannic chloride, said modifier being at least one compound selected from the group consisting of titanium tetra n-butoxide, bismuth trichloride and titanium tetrachloride.

References Cited

UNITED STATES PATENTS

| 3,352,707 | 11/1967 | Pickard | 117—72 |
| 2,478,817 | 8/1949 | Gaiser | 88—105 |
| 2,703,949 | 3/1955 | Gaiser | 49—79 |

DONALL H. SYLVESTER, *Primary Examiner*

JOHN H. HARMAN, *Assistant Examiner.*

U.S. Cl. X.R.

65—60, 118; 117—124